United States Patent
Hui et al.

(10) Patent No.: US 8,169,931 B2
(45) Date of Patent: May 1, 2012

(54) METHOD AND APPARATUS FOR BASE STATIONS AND THEIR PROVISIONING, MANAGEMENT, AND NETWORKING

(75) Inventors: Yan Hui, San Diego, CA (US); Edwin Park, San Diego, CA (US)

(73) Assignee: AirHop Communications, Inc., San Diego, CA (US)

( * ) Notice: Subject to any disclaimer, the term of this patent is extended or adjusted under 35 U.S.C. 154(b) by 443 days.

(21) Appl. No.: 12/469,621

(22) Filed: May 20, 2009

(65) Prior Publication Data

US 2009/0296635 A1    Dec. 3, 2009

Related U.S. Application Data

(60) Provisional application No. 61/055,086, filed on May 21, 2008.

(51) Int. Cl.
*G01R 31/08* (2006.01)
*H04W 4/00* (2009.01)
*H04J 3/16* (2006.01)

(52) U.S. Cl. .................. 370/252; 370/328; 370/465

(58) Field of Classification Search .......... None
See application file for complete search history.

(56) References Cited

U.S. PATENT DOCUMENTS 6,999,784 B1 *  2/2006  Choi ........................ 455/522
7,127,267 B2 * 10/2006  McGowan et al. ........ 455/522

* cited by examiner

*Primary Examiner* — Nittaya Juntima
(74) *Attorney, Agent, or Firm* — Van Pelt, Yi & James LLP

(57) ABSTRACT

In wireless system, a group of Base station (BTSs) with smaller footprints have the capability to communicate with each other as well as with the BTSs with relatively larger footprints via wireless air-interfaces. One of such example is coordinated cell systems. A coordinated cell system comprises a group of coordinated cell base stations that have the capability to communicate with each other as well as with relevant macro cell or Pico cell base stations via wireless air-interfaces. Each coordinated cell BTS consists of an over the air control unit in addition to the conventional coordinated cell BTS system. A set of protocols in the form of messages and database are also defined to enable the networking capability. This enables enhancement in performing a variety of tasks by coordinated cell systems, including interference management and coordination, registration and authentication, quality of service coordination, installation and maintenance, location services, etc.

28 Claims, 11 Drawing Sheets

METHOD AND APPARATUS FOR BASE STATIONS AND THEIR PROVISIONING, MANAGEMENT, AND NETWORKING

RELATED APPLICATIONS

This application claims the benefit of co-pending U.S. Provisional Application No. 61/055,086, filed May 21, 2008, entitled "Method and Apparatus of Pico Cell or coordinated cell Base Station or Access Point and Their Provisioning, Management, and Networking" which is hereby incorporated by reference in its entirety.

BACKGROUND

This invention pertains to wireless communications, particularly related to any wireless systems which consist of a group of base stations (BTSs) with smaller coverage areas in order to cover a larger coverage areas, or co-existence of a group of BTSs with smaller coverage areas and BTSs with larger coverage areas. One specific example is a Femtocell or Pico cell network and base station system. In the following description, even though we describe the system using certain examples, it should be noted that all the techniques can be used in any other BTS systems with similar properties, including but not limited to Femtocell, Pico cell, WiFi access points and so on.

Referring to FIG. 1, a Femtocell 110a or 110b is a smaller cellular base station or access point having a coverage area or foot print 112a and 112b that operates in either licensed frequencies, or if so desired, in unlicensed frequencies. A Femtocell uses the available broadband access 114a and 114b, such as DSL, cable, fiber optics, or fixed wireless broadband access networks, to tunnel the user data (from user equipment devices (UEs) such as a cellular telephone or other device capable of wirelessly communicating with the base station 110a or b) and control data through the broadband connection and connect to the cellular core network backhauls. An example of such an arrangement is illustrated in FIG. 1.

The current Femtocell systems described above have a number of problems that arise due to the fact they are more of a consumer device than a traditional base station, and therefore the operator provisioning, or rather lack of it, and make the deployment and maintenance very difficult and not cost effective, if not impossible.

US patent application 20070254620 "Dynamic Building of Monitored Set" tried to address difficulties in handover due too many neighboring cells in a Femtocell environment as well as handover from the macro network to Femtocells. It proposed for the Femtocell radio base station node to comprise a receiver for receiving scanned cell information and a reporting unit providing the scanned cell information to the radio network control node. Even though the description introduced an additional receiver in the Femtocell, it is only used to scan channel information using the same air-interface as the Femtocell transceiver. It didn't enable the full functional over-the-air communications between the Femtocells and macro cell or among the Femtocells. Further more, due to the above limitations, the system is still very limited in addressing neighboring cell search related issues and it didn't address issues of interference management, security, registration, authentication, scheduling and QoS, location, etc.

US patent application 20080076392 "METHOD AND APPARATUS FOR SECURING A WIRELESS AIR INTERFACE" proposed communication between the Femtocell and macro networks through an Iu interface or equivalent for the purpose of registration, handover and so on. It does not have any over-the-air communications between the Femtocells and macro cells, and among the macro cells. Furthermore, it doesn't address issues related to interference management, security, registration, authentication, scheduling and QoS, location, etc.

US patent application 20080096553 "MOBILE COMMUNICATION NETWORK" described a method of creating a unified wireline/wireless communication network. It does not have any over-the-air communications between the Femtocells and macro cells, and among the macro cells. Furthermore, it doesn't address issues related to interference management, security, registration, authentication, scheduling and QoS, location, etc.

US patent applications 20080081636 "ACCESS CONTROL SYSTEM, METHOD, AND ARRANGEMENT IN A WIRELESS COMMUNICATION NETWORK", 20070270152 "ACCESS CONTROL IN A MOBILE COMMUNICATION SYSTEM", and 20070270152 "ACCESS CONTROL IN A MOBILE COMMUNICATION SYSTEM" all cope with the subject of access control for Femtocells. The basic idea is to build a database for access control. It does not have any over-the-air communications between the Femtocells and macro cells, and among the macro cells. Furthermore, it doesn't address issues related to interference management, security, registration, authentication, scheduling and QoS, location, etc.

SUMMARY OF THE INVENTION

The present invention includes methods, apparatuses, and systems as described in the written description and claims. In one example in a wireless system, a group of base station (BTSs) with smaller coverage areas has the capability to communicate with each other as well as with the BTSs with relatively larger coverage areas via wireless air-interfaces.

In one embodiment a wireless communication system includes a first coordinated base station comprising a first base station subsystem for providing wireless down link communications to and receiving wireless up link communications from one or more wireless user equipment devices and a first over-the-air communications unit in communication with the first base station subsystem for providing wireless communication with a first macro cell base station in order to communicate with a second coordinated base station; the second coordinated base station comprising a second base station subsystem for providing wireless down link communications to and receiving wireless up link communications from one or more wireless user equipment devices and a second over-the-air communications unit in communication with the second base station subsystem for providing wireless communication with a second macro cell base station in order to communicate with the first coordinated base station.

Additionally, the first over-the-air communications unit can further include a wireless transceiver for providing the wireless communication with the first macro cell base station.

The first over-the-air communications unit can comprise a wireless transceiver for providing the wireless communication with the first macro cell base station and an auxiliary receiver to measure one or more parameters of the down link signal of another base station.

Further, the first macro cell base station and the second macro cell base station can be the same macro cell base station. The first base station subsystem can utilize a first air interface protocol and the macro cell base station and the wireless transceiver of the first over-the-air communications unit utilize a second air interface protocol.

In one embodiment the first macro cell base station and the wireless transceiver of the first over-the-air communications unit all utilize a first air interface protocol.

In one embodiment the first coordinated base station further comprises a control unit which provides control information relating to interference management to the first base station subsystem and derives that control information from messages received from the second coordinated base station via the first over-the-air communications unit.

In a further aspect the control information is further related to quality of services coordination.

In one embodiment the first base station subsystem comprises a wireless transceiver system and the wireless transceiver of the first over-the-air communications unit is implemented by the wireless transceiver system of the first base station subsystem.

In a further aspect the first base station subsystem utilizes a first air interface protocol and the second base station subsystem utilizes a second air interface protocol.

In one embodiment the communications between the first coordinated base station and the second coordinated base station include information selected from the group of radio resource parameters, radio environment measurements, station status, and measurements of wireless user equipment devices. Alternatively, the first base station subsystem down link communications are transmitted as orthogonal frequency division multiplexed signals and the first base station subsystem zero outs tones of in response to the control information.

In one embodiment the first base station subsystem down link communications are transmitted as orthogonal frequency division multiplexed signals and the first base station subsystem adjusts the transmit power for one or more tones in response to the control information.

In one embodiment a method of operating a network of coordinated cell base stations with each coordinated cell base station having down link and up link communications with one or more associated user equipment includes: transmitting a database of information regarding the coordinated cell base stations in the network to the a first coordinated cell base station; updating the database of information regarding the coordinated cell base stations in the network to include information relating to the first coordinated cell base station; a first user equipment device registering with the first coordinated cell base station via a second wireless transceiver of the first coordinated cell base station; the first coordinated cell base station receiving a communication from a neighboring coordinated cell base station; and adjusting a parameter of one or more of the down link communication and the up link communication of the first coordinated cell base station in response to the communication from a neighboring coordinated cell base station.

The method can also include using an auxiliary receiver in the first coordinated cell base station to measure one or more parameters of the down link transmission of the macro cell base station.

The method can also include reporting the measured one or more parameters of the down link transmission of the macro cell base station and the downlink transmission power of the first coordinated cell base station to the macro cell base station; and transmitting a desired downlink transmission power to the first coordinated cell base station.

The method can also include reporting the uplink transmission power of the first user equipment device to the first macro cell base station; and when the user equipment device up link transmission power generates a selected amount of interference with other user equipment devices in the macro cell of the first macro cell base station, sending an instruction to the first coordinated cell base station to send an instruction to the first user equipment device to decrease the power of its up link transmission.

The method can also include the first coordinated cell base station measuring one or more parameters of the down link transmission of a neighboring coordinated cell base station and reporting the measurement to the first macro cell base station.

In a further aspect the auxiliary receiver utilizes the hardware of the second transceiver.

The method can also include the first coordinated cell base station registering with a first macro cell base station via a wireless transceiver.

In a further aspect a method of operating a network of coordinated cell base stations having associated user equipment devices, the method comprises: transmitting a database of information regarding the coordinated cell base stations in the network to the first coordinated cell base station; updating the database of information regarding the coordinated cell base stations in the network to include information relating to the first coordinated cell base station; using an auxiliary receiver in the first coordinated cell base station to measure one or more parameters of the down link transmission of a neighboring coordinated cell base stations; and adjusting one or more down link communication parameters of the first coordinated cell base station in response to the measured one or more parameters.

In another aspect the parameter is the transmit power of the down link communications. Additionally, the down link communications can be transmitted as orthogonal frequency division multiplexed signals and the transmit power is adjusted for one or more tones.

In another aspect the down link communications are transmitted as orthogonal frequency division multiplexed signals and the adjustment to one or more parameters is to zero out tones of a. Further, the adjustment of one or more parameters is changing the power of a code channel.

The method can also include a first user equipment device registering with the first coordinated cell base station via a coordinated cell transceiver of the first coordinated cell base station.

In another aspect a wireless communication system comprises a first coordinated base station comprising a first base station subsystem for providing wireless down link communications to and receiving wireless up link communications from one or more wireless user equipment devices and a first over-the-air communications unit in communication with the first base station subsystem for providing wireless communication with a second coordinated base station; the second coordinated base station comprising a second base station subsystem for providing wireless down link communications to and receiving wireless up link communications from one or more wireless user equipment devices and a second over-the-air communications unit in communication with the second base station subsystem for providing wireless communication with the first coordinated base station.

In another aspect a coordinated wireless base station system comprises a base station subsystem for providing wireless down link communications to and receiving wireless up link communications from one or more wireless user equipment devices with the down link communications and the up link communications have associated parameters; an auxiliary receiver to measure one or more characteristics of the down link signal of a neighboring base station; and a control unit which receives from the auxiliary receiver the measurements of the one or more characteristics of the down link signal of a neighboring base station, determines control information relating to interference management in response to the received measurements of the one or more characteristics of the down link signal of a neighboring base station and provides control information relating to interference management to the base station subsystem; wherein the base station subsystem adjusts one or more of the parameters of one or more of the uplink communications and the down link communications in response to the control information.

In another aspect a coordinated wireless base station system comprises a base station subsystem for providing wireless down link communications to and receiving wireless up link communications from one or more wireless user equipment devices with the down link communications and the up link communications have associated parameters; an auxiliary receiver to measure one or more characteristics of the down link signal of a neighboring base station; and a control unit which receives from the auxiliary receiver the measurements of the one or more characteristics of the down link signal of a neighboring base station, determines control information relating to interference management in response to the received measurements of the one or more characteristics of the down link signal of a neighboring base station and provides control information relating to interference management to the base station subsystem; wherein the base station subsystem adjusts one or more of the parameters of one or more of the uplink communications and the down link communications in response to the control information.

Other features and advantages of the present invention should be apparent after reviewing the following detailed description and accompanying drawings which illustrate, by way of example, aspects of the invention.

DETAILED DESCRIPTION

After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention.

The following embodiments describe a general overlay wireless system, where a group of base stations (BTSs) which may have smaller footprints (e.g., BTSs and referred to here after as coordinated cell BTSs) have the capability to communicate with each other as well as with the BTSs which may have relatively larger footprints (e.g., macro cell BTSs and referred to hereafter as macro cell BTSs even though they may not have larger foot prints than the coordinated cell BTSs) via wireless air-interfaces (also referred to as air interface protocols). It is intended that the use of the term coordinated cell encompasses various types of BTSs including Femtocell, pico cell, macro cell, relay station, repeater, and WiFi access points, to name a few. The term coordinated cell is used herein to primarily denominate the relationships among BTSs. Similarly, the term macro cell and macro cell BTS is also used to denominate the relationships between BTSs (e.g., a BTS with a larger footprint that overlaps a coordinated cell BTS) and not necessarily to indicate other characteristics of the BTS. Even though reference is made herein to coordinated cell systems for easier explanation of the technologies and systems, it is only considered as a specific application of the invention.

Figure 1:
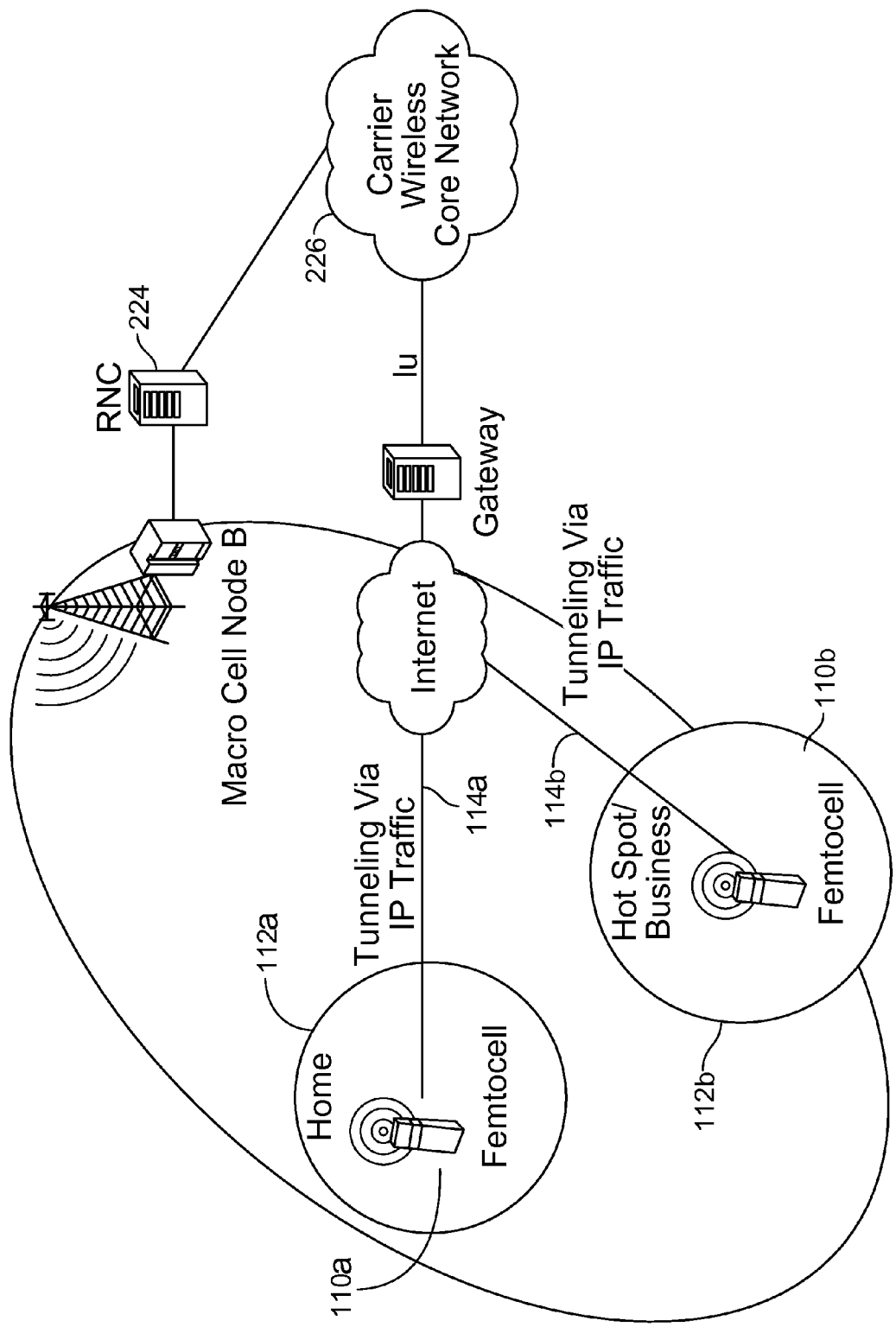
FIG. 1 is a drawing of a typical Femtocell system and its relationship with a macro cell.
Figure 2:
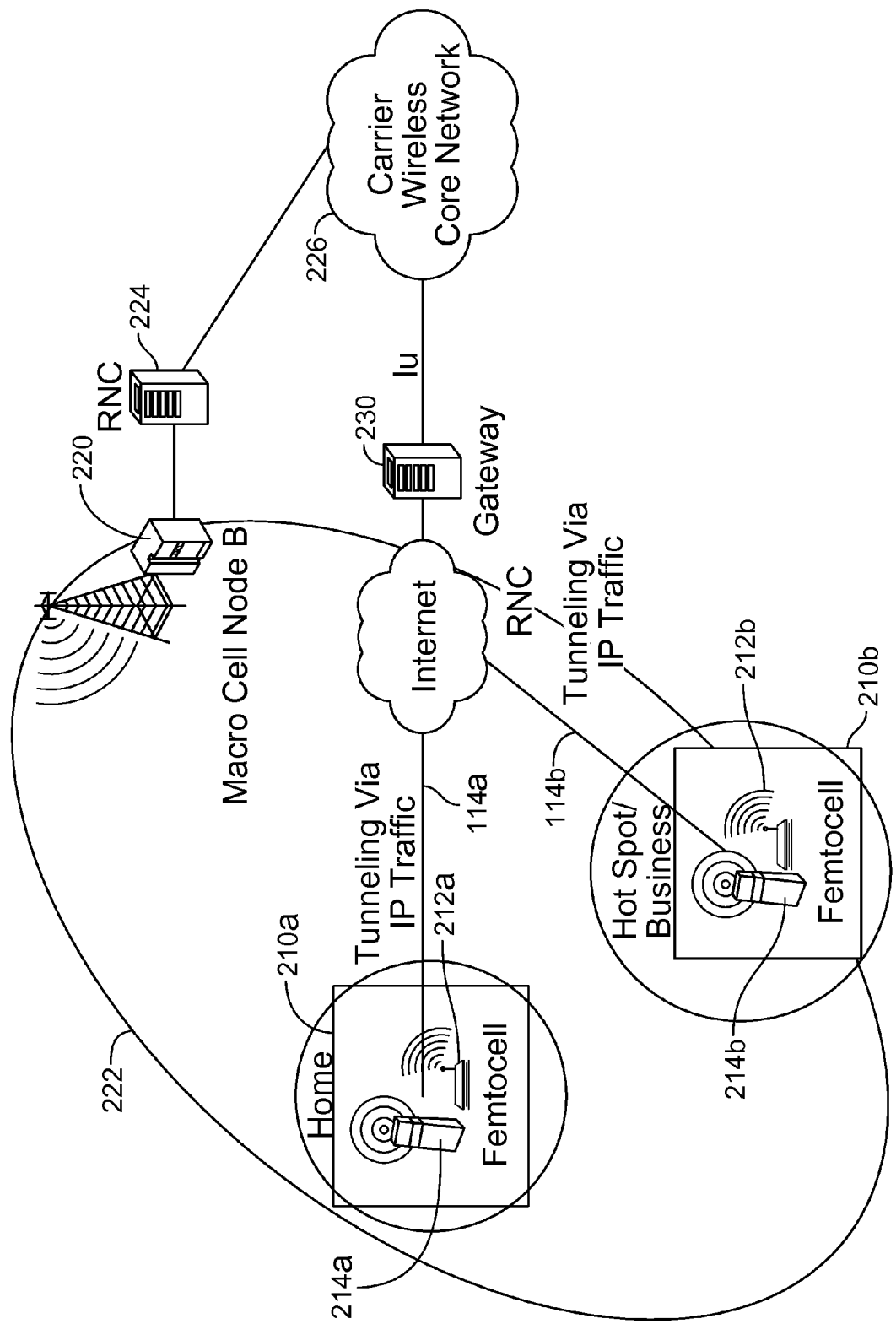
FIG. 2 is a drawing of a coordinated cell system according to an embodiment of the present invention.

Using a coordinated cell system as an example, this is illustrated in FIG. 2. Two coordinated cell BTSs 210a and 210b are located within the footprint or coverage area 222 of a macro cell BTS or node B 220. The macro cell BTS communicates with the carrier wireless core network 226 via a RNC (radio network controller) 224. Each coordinated cell 210a and 210b includes an over the air control unit 212a and 212b and a conventional BTS transceiver 214a and 214b. Although only two coordinated cells are depicted in this example, it is to be understood that the teachings apply to larger groups of coordinated cell BTSs, including three or more. Each coordinated cell uses the available backhaul 114a and 114b, such as DSL, cable, fiber optics, or fixed wireless broadband access networks, to send the user and control data to the cellular core network 226.

A set of protocols in the form of messages and database(s) of network related information are defined to enable the networking between the coordinated cells 210 via the air control units 212a and 212b and, in one example, via the macro cell BTS 220 and the associated network 226. This enables enhancement in performing a variety of tasks by such a system of coordinated cells, including interference management and coordination, registration and authentication, quality of service coordination, installation and maintenance, location detection and monitoring (collectively, resource management or adjustment). Furthermore, the underlying networking capability can enable more advanced applications.

Figure 3:
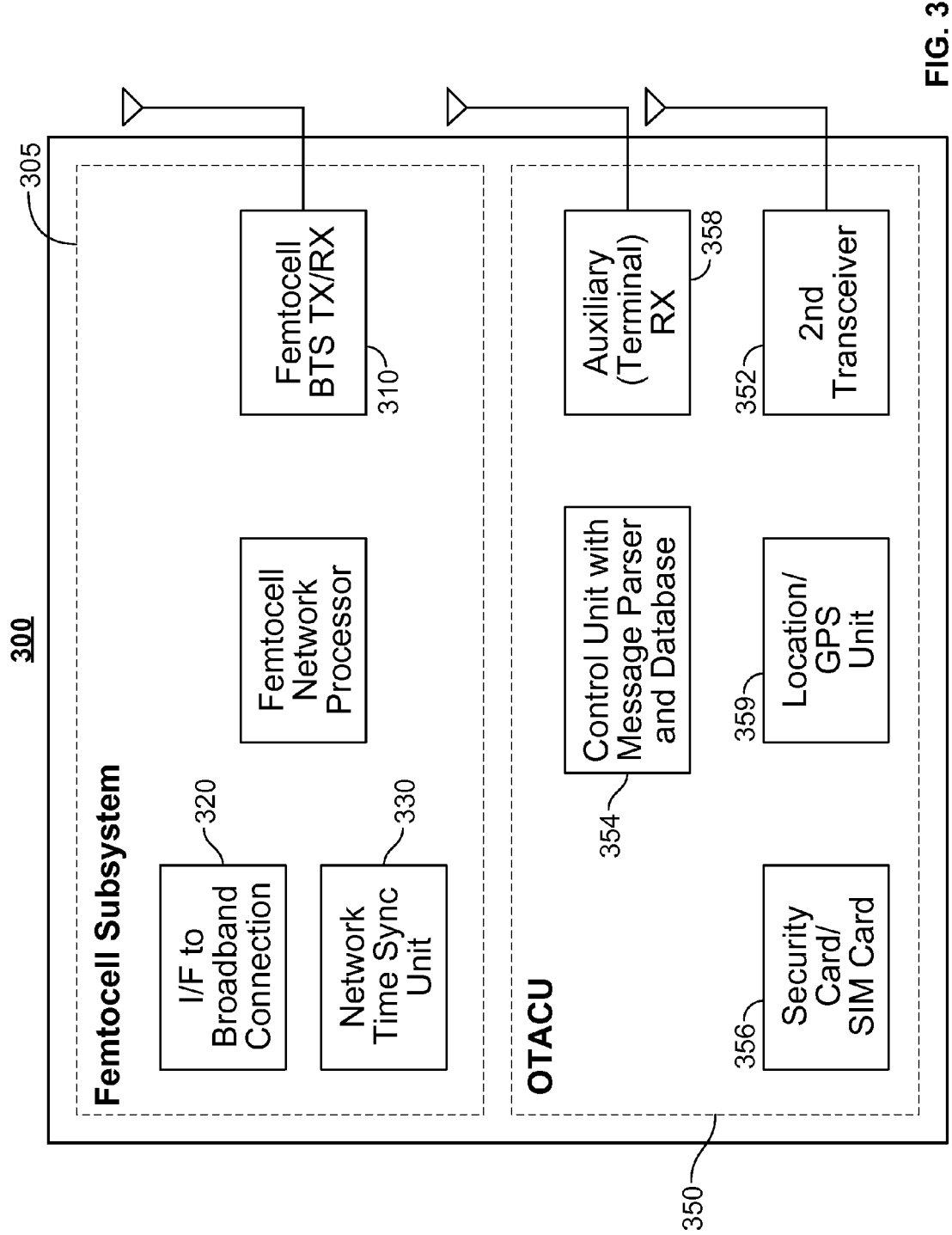
FIG. 3 is a block diagram depicting the functionality of a base station system.

Referring to FIG. 3, one example of a coordinated cell BTS such as BTSs 210a and 210b is shown as BTS 300. BTS 300 includes the typical BTS architecture (e.g., Femtocell architecture), including a BTS transmitter and receiver unit 310 for the desired air interface, an interface to the backhaul 320, a unit for timing synchronization 330 to the overall networks and a network processor 340 for providing overall control functions and operation of the BTS. This is referred to as the coordinated cell or base station subsystem 305. The BTS 300 further includes an additional sub-system 350 that can support the over the air communications.

The additional sub-system, referred to herein as the over-the-air communications unit (OTACU) 350, can be comprised of one or more of the following functionalities illustrated in block format in FIG. 3. In some embodiments, the functionalities of the OTACU 350 which are described below are implemented in the same hardware as the base station subsystem 305 or with some of the same hardware.

A second wireless transceiver unit 352 is used for communications between the BTS 300 (e.g., BTSs 210a and 210b of FIG. 2) and another BTS (e.g., a macro cell BTS with a larger footprint of FIG. 2) or directly between coordinated cell BTSs. The second wireless transceiver unit 352 can have the same air interface as that used for communications with mobile units or user equipment devices (UE) associated with the coordinated cell 300 or it can utilize a different air interface. In terms of functionality, in one embodiment, the second wireless transceiver 352 is approximately equivalent to a UE. The second transceiver does not have to be a separate unit in a practical implementation. It can be re-configured from the BTS transceiver 310 using a re-configurable technique. In another embodiment, the second wireless transceiver uses the same air-interface as that between the BTS and the UE. Therefore, in that embodiment the second wireless transceiver is part of the BTS 305.

The control unit 354 provides the functionality of sending, receiving and parsing messages: between the two sub-systems in the BTS 300; between the BTS 300 and a macro cell BTS; and between the BTS 300 and other coordinated cell BTSs.

In addition, the control unit 354 includes the algorithms (implemented as software, firmware and/or hardware) responsible for interference management, security, installation and maintenance, quality of services coordination, and location detection, detailed below. All of those functions can be performed and operated: between BTS 300 and one or more macro cell BTSs; and between BTS 300 and other coordinated cell BTSs.

A protocol in the form of a message set that can be used for all of the communications and control is provided and implemented by the control unit 354. The messages can be part of a newly defined air-interface which is the same or different than the air-interface between the BTS and a UE, or can be encapsulated into the existing air-interface L3 message or into SMS (short message service) messages. In an embodiment of BTS 300 that lacks a second transceiver 352, the messages can also be defined, sent and managed via a wired interface, such as backhaul connections, even though the performance may or may not be compromised depending on the implementation.

Also associated with or contained in the control unit 354 is a database including the IDs of the neighboring coordinated cell BTSs and associated information, and the topology of the coordinated cell BTSs. The information regarding neighboring coordinated cell BTSs includes but is not limited to: air-interface used, frequency band used, current transmit power, UE (user equipment) class supported, QoS (quality of service) class, location, radio resource information and parameters, thresholds for different parameters, and other information that can be useful for quality of service management, interference management.

The control unit 354 includes an initialization program that can initialize and download software from a storage devices (e.g. flash memory), or network either through the over the air connection or via the backhaul when the OTACU 350 is initialized and/or powered on.

The control unit 354 may include an identification card 356 with a unique identification number that allows the BTS 300 to register with the macro cell networks or the coordinated cell networks. One example of such card is a so called SIM card used in GSM networks. Alternatively, the identification card 356 can be located in the base station subsystem.

The OTACU 350 can also include a second wireless receiver (auxiliary receiver) 358 supporting the same air-interface as the BTS 300. This is used to measure the parameters such as power, direction/location information, and interference from other coordinated cell and/or macro BTSs. The auxiliary transceiver 358 does not have to be a separate unit in a practical implementation. It can be re-configured from the first set of BTS transceivers using re-configurable techniques.

A location unit 359 that can be used to determine the location of the device itself, such as GPS, or other technique based location unit, and an interface that can communicate the location to the control unit 354 is also included. The location can be determined absolutely, for example in terms of latitude and longitude, or relatively, for example in relation to other base stations.

As an example, an LTE coordinated cell can have a GSM transceiver sub-system as an OTACU, and using a set of control commands which are encapsulated in SMS as means for communication. Another example would be a LTE or WiMax coordinated cell with a CDMA based transceiver sub-system as the OTACU.

As another example, the OTACU protocol and messages can be incorporated into the air-interface that is used by BTS and UEs Further aspects and embodiment of the over the air communications in a wireless network consisting of coordinated cell BTSs such as the embodiment shown in FIG. 3 and macro cell BTSs will now be described.

Once powered on, the control unit (e.g., OTACU 350 shown in FIG. 3) of a coordinated cell can register with, be authenticated by and communicate with a macro cell BTS or another coordinated cell constantly, and perform the desired functions to be described in the later sections. The OTACU 350 has the same air-interface as the macro cell BTS that it communicates with. However, it doesn't have to have the same air-interface as the coordinated cell BTS(s) it attaches or will coordinate with, nor does it have to be the same interface as the macro cell BTS the associated coordinated cell BTS(s) communicates through.

Once powered on, the control unit (e.g., OTACU 350) of a coordinated cell can register with, be authenticated by and communicate with other coordinated cells via a macro BTS to perform the desired functions to be described in the later sections. The coordinated cell BTS can appear to the macro cell BTS like any other subscriber or it can be identified to the macro cell BTS as a coordinated cell BTS. The OTACU 350 has the same air-interface as the macro cell BTS that it communicates with. However, it doesn't have to have the same air-interface as the coordinated cell it attaches to (networks with), nor does it have to be the same as the macro cell BTS the associated coordinated cell communicates through. Further more, it may have the same air-interface or a different air-interface as the OTACU of the coordinated cell it tries to associate with. In addition, communications amongst the coordinated cell BTSs do not have to be point-to-point (PTP). They can be point-to-multi-point (PTMP). For example, when more than one of the coordinated cell BTSs is within the foot print of the same macro cell base station, that macro cell BTS can broadcast information to all of those coordinated cell BTSs. Similarly, a coordinated cell BTS can broadcast information to a plurality of neighbor coordinated cell BTSs.

The following is an example of the operation of a self-organized network (SON) among coordinated cell BTSs.

Macro cell BTS(s) as well as each coordinated cell BTS in the mesh build and maintain a database with all the coordinated cell IDs in the macro cells (can also include those in other macro cells) as well as the topology of the coordinated cells. When a new coordinated cell powers up, the control unit of the coordinated cell can register with and be authenticated by a macro cell BTS or one of the neighboring coordinated cells. It then will get the database from the macro cell or from one of the neighboring coordinated cells in the mesh network. The coordinated cell BTS then send its own information to the macro cell BTS or one of the neighboring coordinated cells for it to update its database. The macro cell BTS can then broadcast the updated database to all coordinated cells in the network. Alternatively, the coordinated cell BTS can send its own information to its neighboring coordinated cell BTS(s) for them to update and for them to pass to other coordinated cells in a SON fashion. Alternatively, it can use other methods to update the database.

Even though a GSM networks is used as an example of OTA (over the air) provisioning, one can use other type of wireless networks, including but not limited to GSM/GPRA/EDGE, UMTS, cdma2000, 1xEVDO, WiMax, LTE, UMB, or any other type of wireless networks that are capable of the above control functions.

Figure 4:
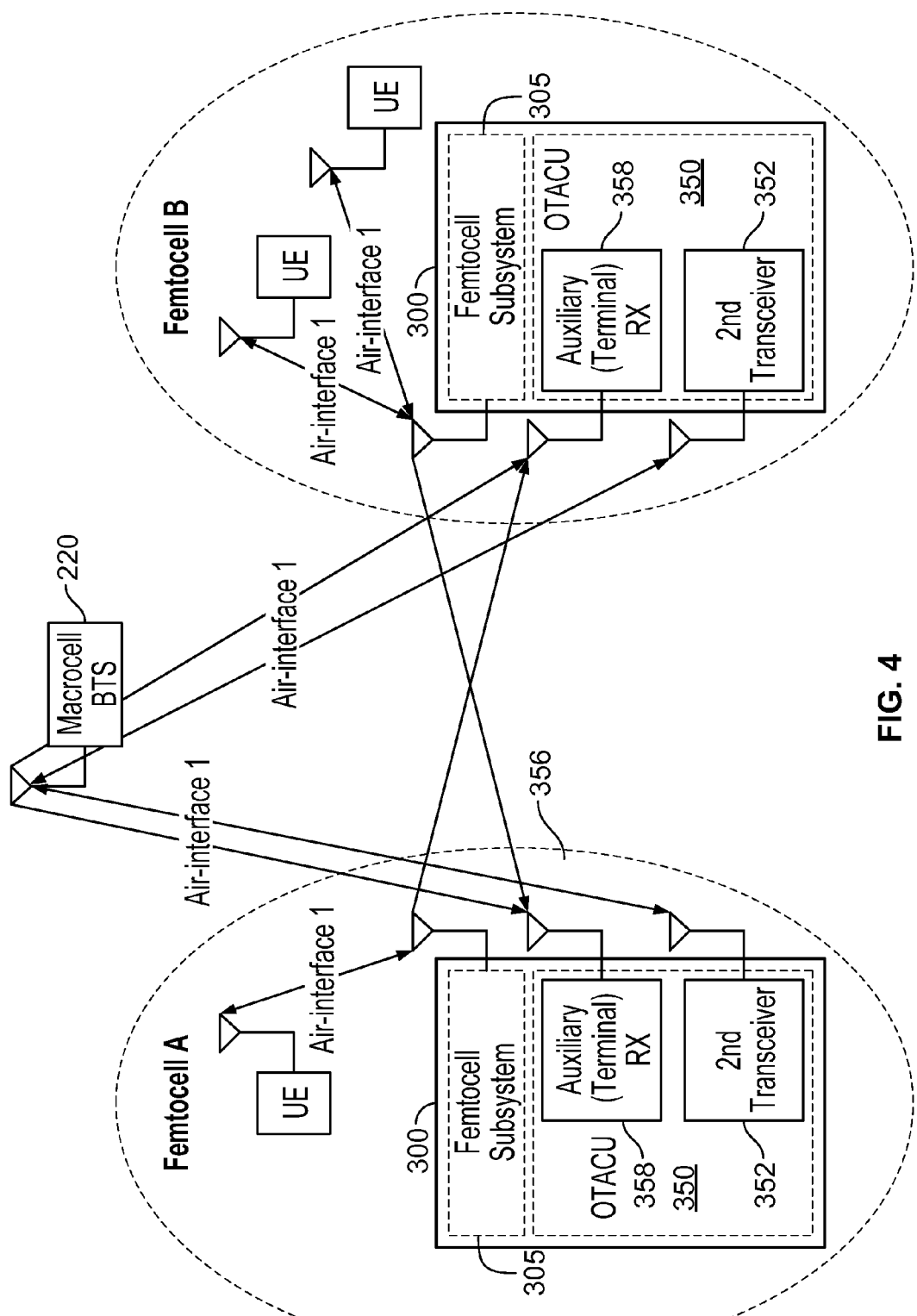
FIG. 4 is a block diagram depicting an example of communications between two coordinated cells and a macro cell BTS.

FIG. 4 illustrates the example for when the air interface between the coordinated cell BTSs and their associated UEs and the air interface between the coordinated cell BTSs and the macro cell BTS are the same. The auxiliary receiver in each of the coordinated cell BTSs also supports the same air interface and therefore can determine characteristics of signals transmitted by neighboring coordinated cells and the macro cell BTS.

Figure 5:
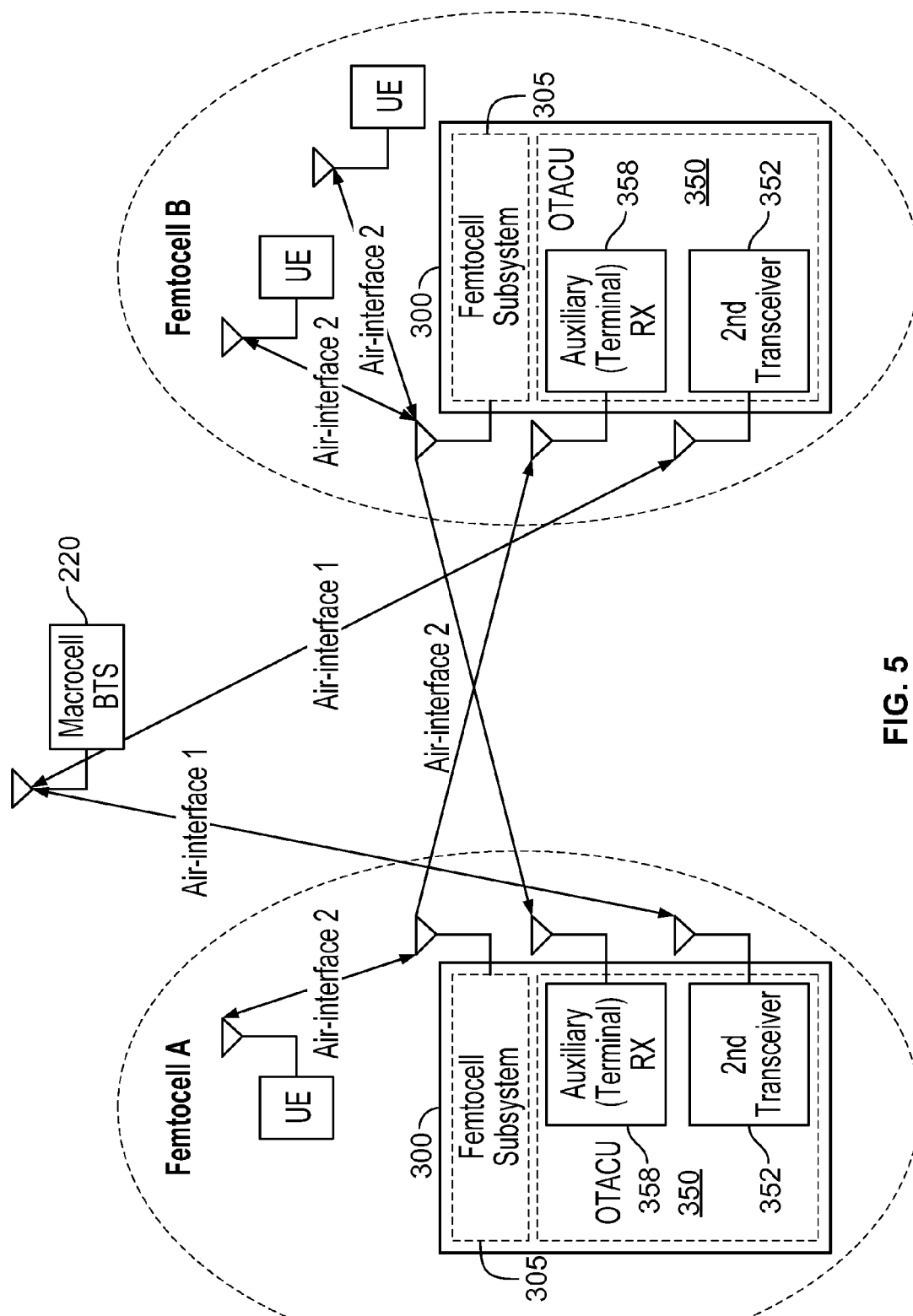
FIG. 5 is a block diagram depicting an example of communications between two coordinated cells and a macro cell BTS.

FIG. 5 illustrates the example for when the air interface (air interface 2) between the coordinated cell BTSs and their associated UEs is not the same as the air interface (air interface 1) between the coordinated cell BTSs and the macro cell BTS. The auxiliary receiver in each of the coordinated cell BTSs supports the same air interface (air interface 2) as that between the coordinated cell BTSs and their associated UEs.

Figure 6:
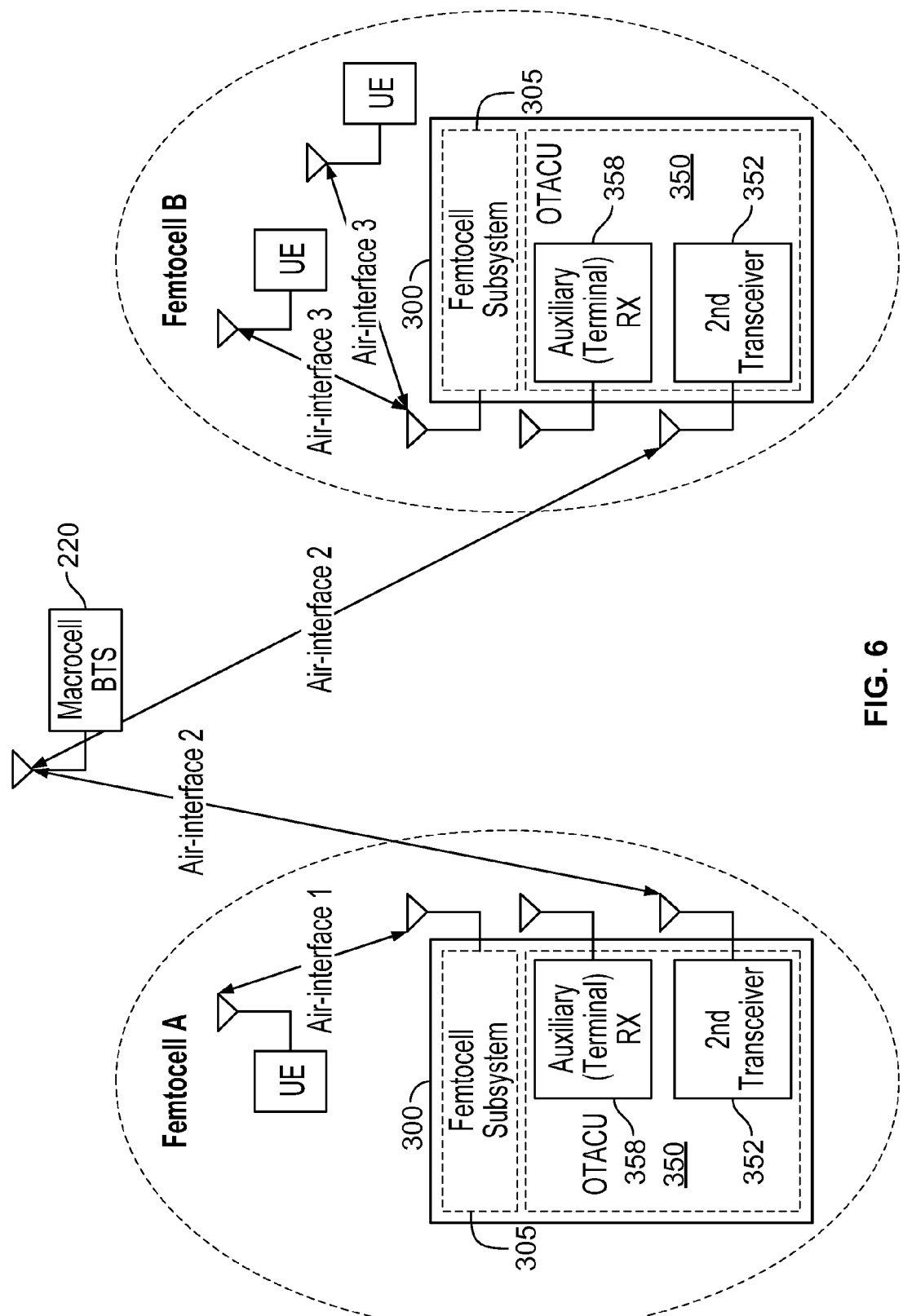
FIG. 6 is a block diagram depicting an example of communications between two coordinated cells and a macro cell BTS.

FIG. 6 illustrates the example for when the air interfaces (air interface 1 and 3) between the coordinated cell BTSs and their associated UEs are not the same as the air interface (air interface 2) between the coordinated cell BTSs and the macro cell BTS. The auxiliary receiver 358 in coordinated cell BTS A supports the same air interface (air interface 3) as that between the coordinated cell BTS B and its associated UEs and the auxiliary receiver 358 in coordinated cell BTS B supports the same air interface (air interface 1) as that between the coordinated cell BTS A and its associated UEs (only 1 UE is depicted in the figure).

Figure 7:
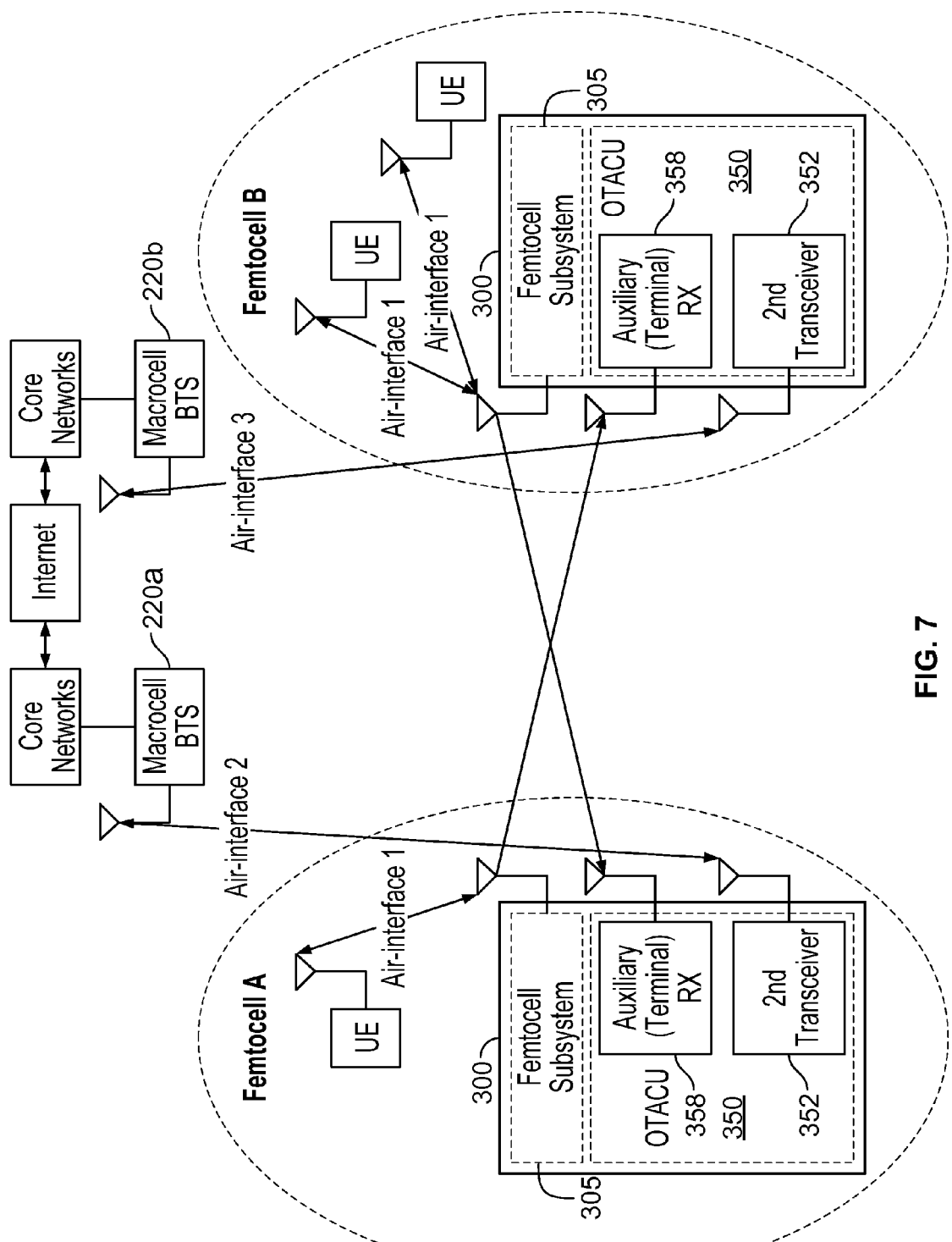
FIG. 7 is a block diagram depicting an example of communications between two coordinated cells and two macro cell BTSs.

FIG. 7 illustrates the example of coordinated cell BTS A communicating with a first macro cell BTS 220a using air interface 2 and coordinated cell BTS B communicating with a second macro cell BTS 220b using air interface 3. In this example, each of the coordinated cell BTSs communicate with their associated UEs using air interface 1. The auxiliary receiver in each of the coordinated cell BTSs supports the same air interface (air interface 1) as that between the coordinated cell BTSs and their associated UEs.

Figure 11:
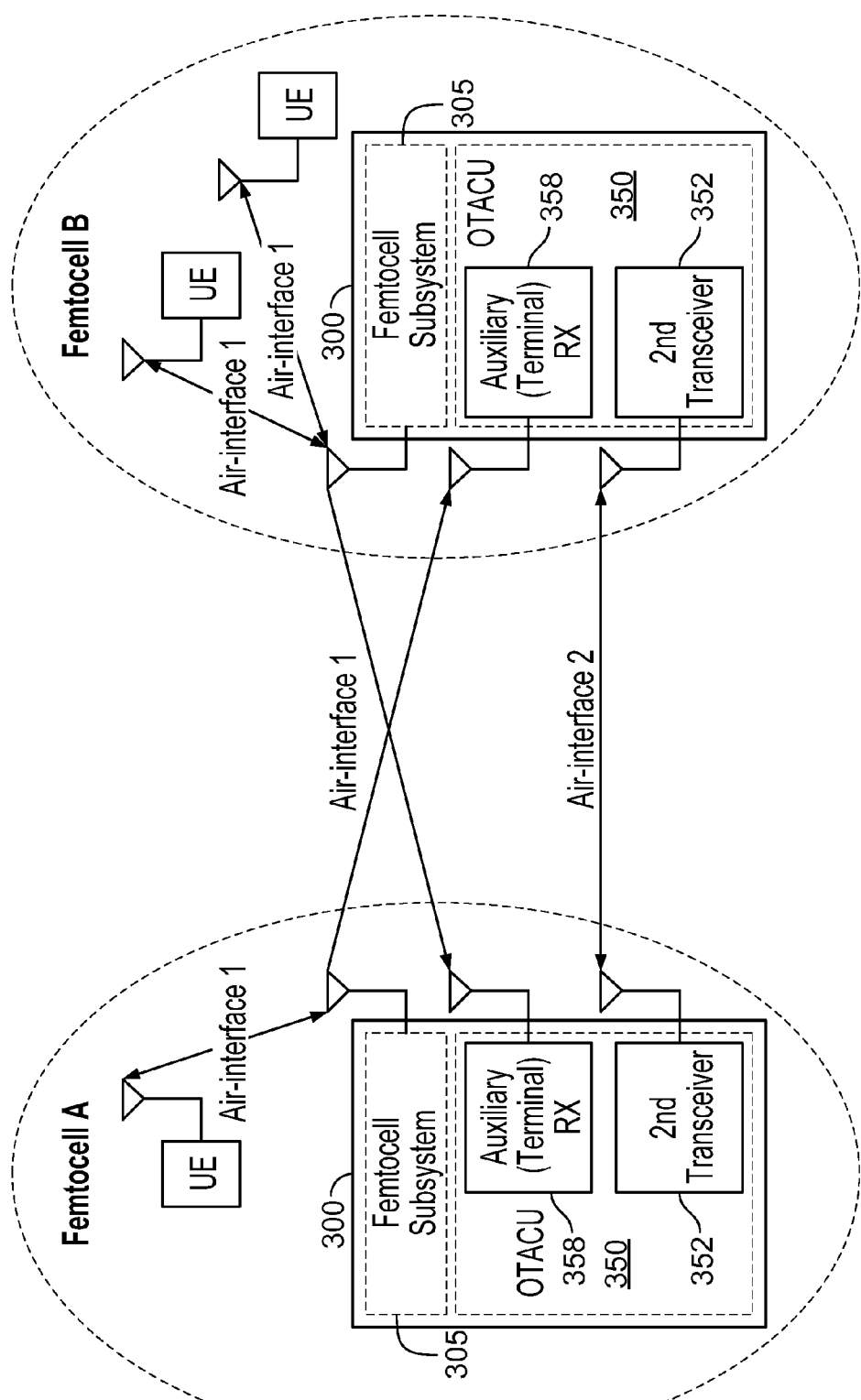
FIG. 11 is a block diagram depicting an example of communications between two coordinated cell BTSs

FIG. 11 illustrates the example of coordinated cell BTS A communicating directly with coordinated cell BTS B without the use of an intervening macro cell BTS. In this example, the second transceiver of each of the coordinated cell BTSs support the same air interface (air interface 2) and each of the BTS subsystems support air interface 1. In one embodiment, each of the BTSs is a WiFi base station.

In another aspect registration, authentication, and security management can include the following functions or functionality (in one embodiment implemented by the corresponding components of the OTACU 350 shown in FIG. 3).

Once powered on or as required, a coordinated cell BTS should register with and be authenticated by a macro cell BTS via the $2^{nd}$ transceiver using the similar process as what a User Equipment (UE) associated with the macro cell BTS normally does. In addition, additional process and information can be included to indicate to the macro cell BTS (and/or the carrier network) that the registrant is a coordinated cell BTS. As an example, if GSM or UMTS is used as the air-interface of the $2^{nd}$ transceiver, SIM card can be used in the registration and authentication process.

UE devices can be granted different access classes based on the factors such as different bill classes or application types. For the UE devices that only need local access within a coordinated cell, the registration and authentication may only need to be done locally with the coordinated cell BTS. Additional changes may be needed in the protocol of the air-interface or a proprietary protocol is needed.

Aspect of interference management and coordination will now be discussed. Coordinated cell BTSs with having the OTACU, when powered up or required, can register with a macro cell BTS or another coordinated cell BTS via the $2^{nd}$ transceiver. The coordinated cell BTS can build a database of the neighboring coordinated cell BTSs. The database can include, but is not limited to, the information about the carrier frequency, transmitter class, downlink transmit power and different thresholds, applications and QoS classes supported.

Figure 8:
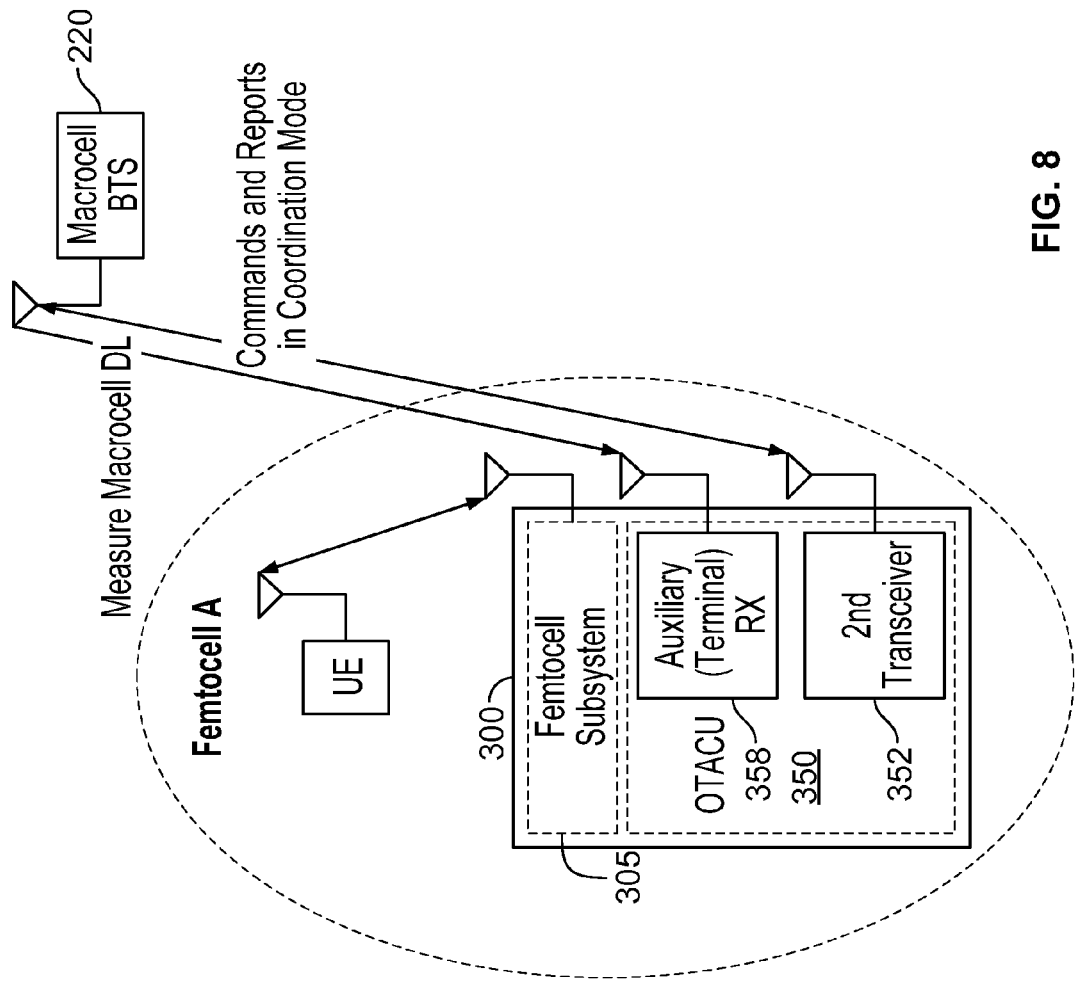
FIG. 8 is a block diagram depicting communications relating to interference management and coordination between a macro cell and a coordinated cell.

Interference management and coordination can also be implemented between coordinated cell BTSs and macro cell BTSs and will be described with reference to FIG. 8. When a coordinated cell BTS and a macro cell BTS use the same carrier frequency with the same bandwidth, interference management can be implemented in an autonomous mode where the radio resources, such as transmit power, code channels, OFDM tones and so on, are adjusted autonomously. For example, in an autonomous mode the auxiliary receiver 358 measures the down link power of the macro cell BTS, or an indicator that measures the interference or quality or both. In response to that information, the coordinated cell BTS adjusts its transmit power, in the case of CDMA systems, adjust the orthogonal code channel usage, and in the case of OFDM systems, adjust the tone allocations of the coordinated cell for down link transmission autonomously in order to minimize interference to macro cell, sufficient for the current UEs to receive data from the coordinated cell with required QoS, and not too high to above the UE receiver dynamic range.

One example is to adaptively zero out more tones as the, or adaptively adjust the power of certain tones to limit inter-coordinated cell interference or coordinated cell-macro interference. This needs to be done for the first time during initial installation. It needs to be done periodically afterwards during the operations in order to adjust for change of coordinated cell location, fluctuation of macro cell transmit power, a change in numbers of UEs or the distance of the UEs or data rate or QoS of UEs in the coordinated cell. The DL power adjustment can be pre-determined by the system and stored in the coordinated cell or in the macro cell. In the latter case, it will be communicated to the coordinated cell over the OTACU 350.

Figure 9:
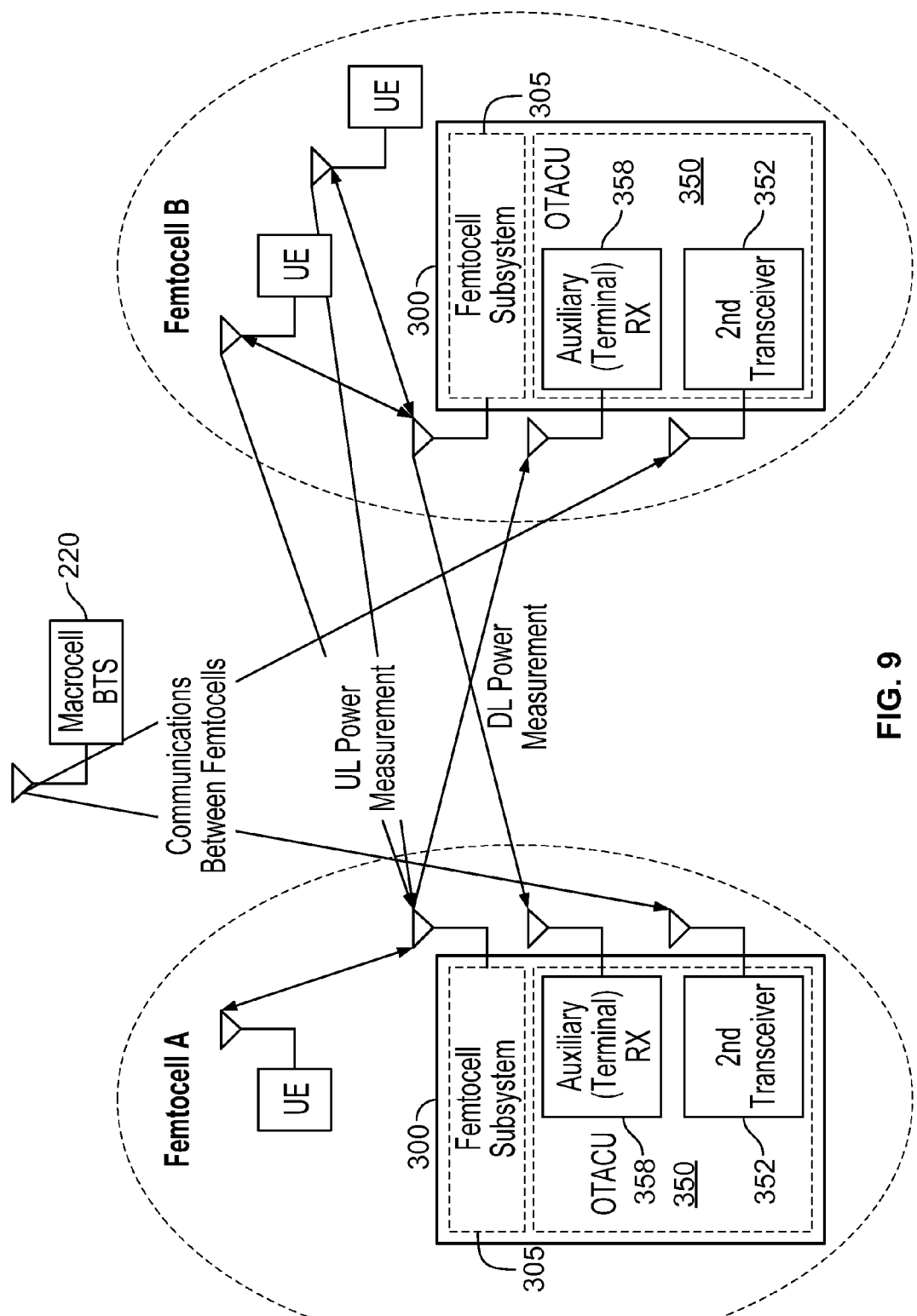
FIG. 9 is a block diagram depicting communications relating to interference management and coordination between coordinated cells.

Referring to FIG. 9, a coordinated mode can also be implemented where the radio resources management, such as transmit power, code channels, OFDM tones, other cell loading information, other cell interference information, and so on, are coordinated. For example, the auxiliary receiver 358 (or the transceiver 352) in the coordinated cell measures the down link power of the macro cell (for OFDM case, the measurement can be per tone based), or an indicator that measures the interference or quality or both, and reports both the macro cell power and its own down link transmit power to the macro cell BTS 220. The macro cell BTS can also order the coordinated cell BTS to measure and report the down link power of its neighbor coordinated cell BTSs (e.g., coordinated cell B), for example, via receiver 358. The macro cell BTS can request the coordinated cell BTS to lower its transmit power (for the OFDM case, the adjustment can be per tone based), and in the case of OFDM systems, adjust the tone allocations of the down link transmission, in order to limit the interference with other coordinated cells and the macro cell itself. The macro cell can also adaptively set a threshold for the down link transmission power of a coordinated cell BTS, or in the OFDM case, adaptively set the down link transmission power of a coordinated cell BTS per tone based on the traffic in the macro cell in order to limit the interference to other coordinated cells and macro cell itself.

The coordinated cell BTS reports UE (in the coordinated cell) up link transmission power to the macro cell BTS 220, or in the OFDM case, up link power per tone. When the UE up link transmission power generates too much interference with other UEs in the macro cell, the macro cell BTS can "force" the coordinated cell UE users to reduce their up link transmission power, or in the OFDM case, up link transmission power per tone, via the down link power/gain control from the coordinated cell BTS.

The macro cell BTS can also adaptively set a threshold of up link transmission power, or for the OFDM case, it can be per tone based, for UEs in a coordinated cell based on the traffic in the macro cell in order to limit the interference to UEs in the macro cell. This can be done via a down link power/gain control instruction from the coordinated cell BTS.

When the coordinated cell uses a dedicated carrier, interference management can be implemented in an autonomous mode where the radio resources, such as transmit power, code channels, OFDM tones and so on, are adjusted autonomously. For example, the coordinated cell auxiliary receiver 358 (or the transceiver 352) measures the down link (DL) power of the macro cell BTS, or an indicator that measures the interference or quality or both, and adjusts the transmit (Tx) power level of, and in the case of OFDM systems, adjust the tone allocations of coordinated cell for DL transmission autonomously in order to minimize interference to the macro cell BTS, sufficient for the current UEs to receive data from the coordinated cell with required QoS, and not too high to above the UE receiver dynamic range. One example is to adaptively zero out more tones, or adaptively adjust the power of certain tones to limit inter-coordinated cell interference or Femto-macro interference. This needs to be done for the first time during initial installation. It needs to be done periodically afterwards during the operations in order to adjust for a change of coordinated cell location, fluctuation of macro cell Tx power, and change in numbers of UEs or the distance of the UEs or data rate or QoS of UEs in a coordinated cell. The DL power adjustment can be predetermined by the system and stored in the coordinated cell or in the macro cell. In the latter case, it will be communicated to the coordinated cell from the macro cell via the air-interface.

When the coordinated cell uses a dedicated carrier, interference management can also be implemented in a coordinated mode where the radio resources, such as transmit power, code channels, OFDM tones, other cell loading information, other cell interference information, and so on, are coordinated. For example, the receiver in the coordinated cell BTS OTACU 350 measures the DL power of the macro cell BTS (for the OFDM case, the measurement can be per tone based, or per group of tones based), or an indicator that measures the interference or quality or both, and report both the macro cell Tx power and its own DL Tx power to the macro cell BTS. The macro cell BTS can also order the coordinated cell BTS to measure and report the DL power of its neighbor coordinated cell BTSs. The macro cell BTS can request the coordinated cell BTS to lower its Tx power (for OFDM case, the adjustment can be per tone based, or per group of tones based), or in the case of OFDM systems, adjust the tone allocations of DL transmissions, in order to limit the interference to other coordinated cells and the macro cell itself. The macro cell BTS can also adaptively set threshold of DL Tx power of the coordinated cell BTS (for the OFDM case, adaptively set the DL Tx power of the coordinated cell BTS per tone based or per group of tones based), based on the traffic in the macro cell in order to limit the interference to other coordinated cells and the macro cell itself.

The coordinated cell BTS also reports UE (in coordinated cells) UL Tx power to the macro cell BTS via the OTACU, or in the OFDM case UL power per tone based or per group of tones based. When UEs (in coordinated cells) UL Tx power generates too much interference to macro cell UE users, the macro cell can "force" the coordinated cell UE users to reduce UL Tx power, for OFDM case per tone based or per group of tones based, via the coordinated cell BTS OTACU.

The macro cell BTS can also adaptively set a threshold of UL Tx power (for OFDM case, it can be per tone based or per group of tones based) of coordinated cell UEs based on the traffic in macro cell in order to limit the interference to macro UEs. This should be done via the OTACU of the coordinated cell BTS.

The system can improve coordination when macro cell and coordinated cell BTSs have carrier frequencies which overlap with different bandwidths. Examples of such overlap include 5 MHz for the macro cell and 20 MHz for the coordinated cell with the same carrier frequency another example arise with new technology and legacy technology being used such as one or more GSM or UMTS bands within the LTE band. When the coordinated cell is powered up, the OTACU communicates with the macro cell before coordinated cell starts transmitting. The macro cell commands the coordinated cell to disable certain tones in order not to interfere with the macro cell frequency. This needs to be done for the first time during initial installation.

In autonomous mode, where the radio resources, such as transmit power, code channels, OFDM tones and so on, are adjusted autonomously, the following should be done periodically afterwards during the operations. The auxiliary receiver in the coordinated cell BTS measures the DL power of the macro cell, or an indicator that measures the interference or quality or both, and adjusts adjust the tone allocations of the coordinated cell DL transmission autonomously in order to minimize interference to macro cell BTS and sufficient for the current UEs to receive data from the coordinated cell with required QoS. One example is to adaptively zero out more tones, or adaptively adjust the power of certain tones of DL to limit inter-coordinated cell interference or coordinated cell—macro cell interference.

In coordinated mode where the radio resources management, such as transmit power, code channels, OFDM tones, other cell loading information, other cell interference information, and so on, are coordinated, the following should be done periodically afterwards during the operations. The macro cell BTS can request the coordinated cell BTS(s) to lower its Tx power per tone based or per group of tones based, or adjust the tone allocations of coordinated cell, in order to limit the interference to other coordinated cells and the macro cell itself. The macro cell can also order the coordinated cell BTS to measure and report the DL power of its neighbor coordinated cell BTSs. The macro cell BTS can also adaptively set a threshold of DL Tx power of the coordinated cell BTS per tone based, based on the traffic in the macro cell in order to limit the interference to other coordinated cells and the macro cell itself. Coordinated cell BTSs can adaptively allocate different tones or different group of tones to coordinated cell UE UL in order to reduce UL interference to macro cell UEs or UEs in other coordinated cells. The macro cell BTS can also adaptively set a threshold of UL Tx power of coordinated cell UEs, per tone based or per group of tones based, or based on the traffic in macro cell in order to limit the interference to macro cell UEs. This should be done via the coordinated cell BTS OTACU.

Interference management and coordination between the coordinated cell BTSs will now be discussed with an example represented in FIG. 10. In an autonomous mode, where the radio resources, such as transmit power, code channels, OFDM tones and so on, are adjusted autonomously, the auxiliary receiver in the coordinated cell measures the DL power of all neighbor coordinated cell BTSs, or indicators that measure the interference or quality or both, and adjusts the DL Tx power of the coordinated cell BTS, and in the case of OFDM systems, adjust Tx power per tone based or per group of tones based or the tone allocations of the coordinated cell BTS DL transmission autonomously in order to minimize interference to macro cell, sufficient for the current UEs to receive data from the coordinated cell with required QoS, and not too high to above the UE receiver dynamic range. One example is to adaptively zero out more tones, or adaptively adjust the power of certain tones to limit inter-coordinated cell interference. This process can be done for the first time during initial installation. It can also be done periodically afterwards during the operations in order to adjust for change of coordinated cell location, fluctuation of macro cell Tx power, change in the numbers of UEs or the distance of the UEs or data rate or QoS of UEs in a coordinated cell. The DL power adjustment can be pre-determined by the system and stored in coordinated cell or in macro cell.

In a coordinated mode, to detect interference from neighbor coordinated cell BTSs on the DL, the auxiliary receiver in the coordinated cell OTACU measures the DL power of neighbor coordinated cells (for OFDM case, the measurement can be per tone based), or other indicators that measure the interference or quality or both. The coordinated cell BTS can report the neighbor coordinated cell DL Tx power and its own DL Tx power, or other indicators that measure the interference or quality or both, to its neighbor coordinated cells and can request or negotiate with the its neighbor coordinated cell BTSs to lower its Tx power (for OFDM case, the adjustment can be per tone based or per group of tones based), and in the case of OFDM systems, adjust the tone allocations of, in order to limit the interference to each other. The coordinated cell BTSs can also adaptively set a threshold of DL Tx power of each coordinated cell BTS, or in the OFDM case, adaptively set DL Tx power of coordinated cell BTS per tone based or per group of tone based, based on the traffic in each coordinated cell in order to limit the interference to each other. To detect interference from neighbor coordinated cell UEs on the UL, the coordinated cell BTS reports the UL Tx power of the UE in its coordinated cell, or other indicators that measure the interference or quality or both, to its neighbor coordinated cells BTSs, or in OFDM case UL power per tone based or per group of tone based. When UEs UL Tx power generates too much interference to its neighbor UEs, its neighbor coordinated cell BTSs can ask the coordinated cell BTS to "force" its UE users to reduce UL Tx power, for OFDM case, per tone based or per group of tone based, or the allocation of the tones. Coordinated cell BTSs can also periodically measure UEs using an indicator that measures the interference or quality or both, in its neighbor coordinated cells. If it detects too much interference from its neighbor coordinated cell UEs, it can request directly its neighbor coordinated cell BTSs to "force" their UEs lower the UL Tx power. Coordinated cell BTSs can also adaptively negotiate and set a threshold of UL Tx power (for OFDM case, it can be per tone based or per group of tones based) for coordinated cell UEs based on the traffic and QoS in each coordinated cells in order to limit the interference to each other.

The coordination mode can also be implemented with the coordinated cell BTSs communicating through the macro cell BTSs.

We now turn to aspects of embodiments relating to providing Quality of Services (QoS). A first embodiment is directed to QoS between coordinated cell BTSs and macro cell BTSs. On both DL and UL QoS, based on the information that the macro cell BTS communicates to coordinated cell BTSs via the OTACU, such as carrier frequency, bandwidth, Tx power etc. and the current applications and its QoS that the coordinated cell BTS is providing, the coordinated cell BTS can adjust the scheduling algorithm in order to use different orthogonal codes or PN sequences (in case of OFDM, different tones or group of tones), different Tx power (in the case of OFDM, different power per tone based or per group of tones based), different Tx antenna configurations, and other possible parameters to provide optimum QoS in the coordinated cell and the macro cell.

With regard to coordination between coordinated cell BTSs, the coordinated cell BTSs can communicate about their current applications and QoS related parameters via their OTACUs. The information can include, but is not limited to, QoS class or priority, estimated duration of the applications, required data rate or throughput, required frame error rate, Tx power, Tx antenna configurations, in the case of OFDM, tone allocation, power per tone or groups of tones, pilot format and power, etc. They can negotiate and coordinate based on certain algorithms or procedures in order to reduce the interference and provide optimum QoS for each coordinated cells. The algorithm can be as simple as round robin or more complicated scheduling algorithms can be used.

Aspects of over the air communications between coordinated cell and macro cell BTSs and between coordinated cells BTSs for installation and maintenance will now be described. With regard to installation of a coordinated cell BTS, instead of only activating the coordinated cell BTS via the backhaul, it can also be activated over the air by the $2^{nd}$ transceiver of the OTACU. The macro cell BTS can assign resources including but not limited to, carrier frequency, bandwidth, maximum Tx power, in case of CDMA systems, the orthogonal/scrambling codes, in the case of OFDM, number of tones and tone group, quality indicators used to measure the QoS, such as frame error rate and QoS class. The macro cell can also send the database with the information of the neighboring coordinated cells including but not limited to carrier frequency, bandwidth, maximum Tx power, in case of CDMA systems, the orthogonal/scrambling codes, in the case of OFDM, number of tones and tone groups. Coordinated cell BTSs can report the information including but not limited to, capability of the coordinated cell BTSs, location derived from GPS or other means.

Figure 10:
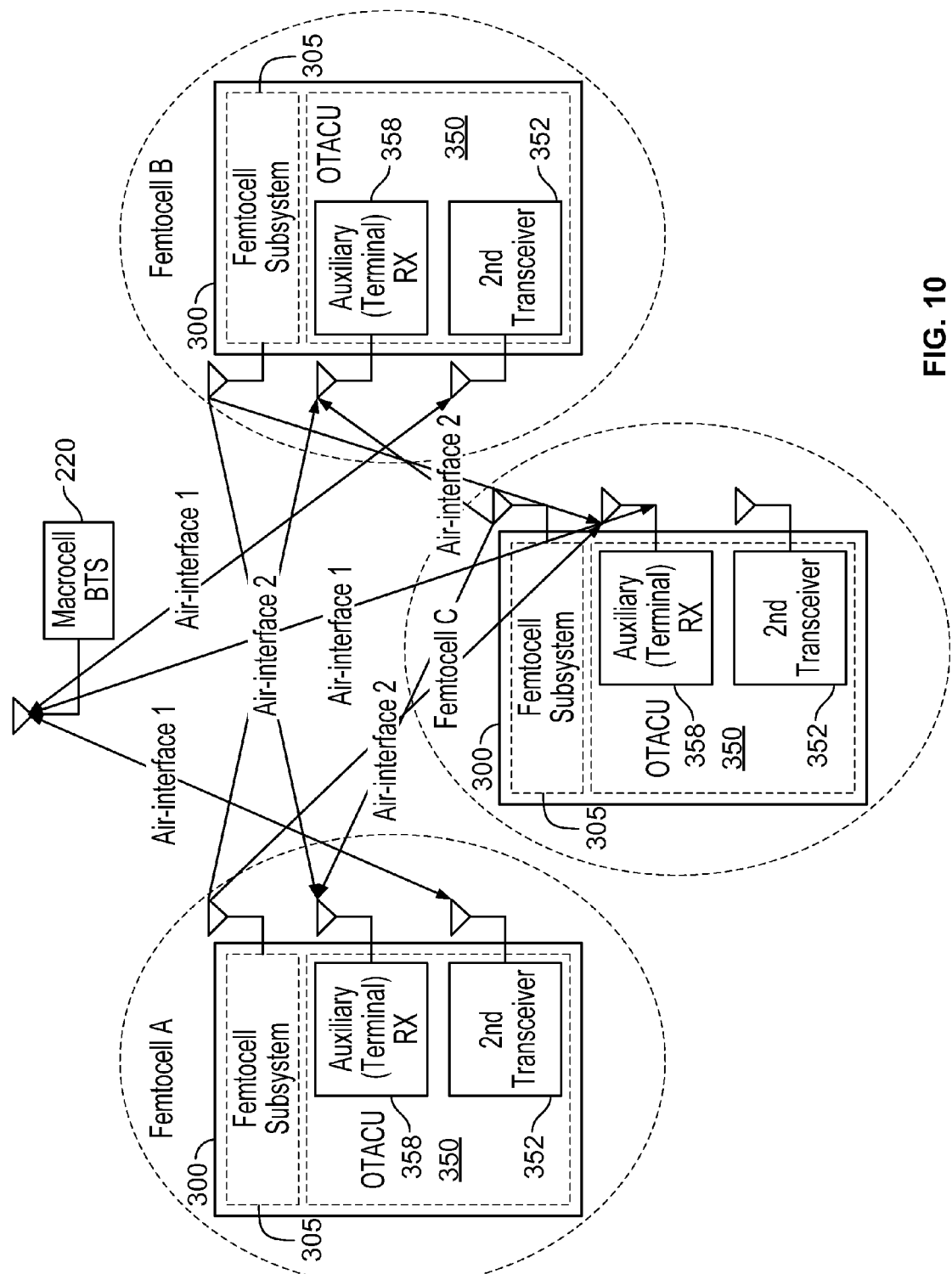
FIG. 10 is a block diagram depicting communications relating to antenna and power configuration during installation and maintenance.

The coordinated cell BTS can perform the following steps in order to configure the initial Tx power and antenna configuration (e.g. MIMO or beam forming configuration), for example in a system such as is depicted in FIG. 10. The auxiliary receiver of the OTACU measures the Tx power of the neighboring coordinated cell BTSs. In the case that the coordinated cell BTS uses the same frequency as the macro cell, it also measures the macro cell BTS Tx power. Based on the Tx power information from the macro cell database, or from direct communications with the corresponding neighbor coordinated cell BTSs, the coordinated cell BTS can estimate what its Tx power should be in order not to introduce interference to the neighboring coordinated cells. In the case that the coordinated cell BTS uses the same frequency as macro cell, it also estimates what its Tx power should be in order not to introduce interference to the macro cell.

Once the coordinated cell BTS starts transmitting, it communicates to the neighboring coordinated cell BTSs about its Tx power via its OTACU. Upon request, the neighboring coordinated cells will measure and report the measurement results via their OTACUs. In the case that the coordinated cell BTS uses the same frequency as macro cell, when possible, macro cell BTS can also indirectly measure the coordinated cell BTS Tx power via UEs in the macro cell. Using the topology of the neighboring coordinated cells, which is from the database macro cell maintains, together with the feedback from neighboring coordinated cell BTSs, the coordinated cell BTS can configure its antenna including using MIMO or beam forming algorithms. The coordinated cell BTS can repeat this process iteratively to calibrate and fine tune the antenna configurations.

During the operations, the coordinated cell BTS can adaptively perform the following steps in order to adjust Tx power and antenna configuration periodically:

1. The auxiliary receiver of the OTACU measures the Tx signal properties (e.g., power or signal to noise ration) of the neighboring coordinated cell BTSs. In the case that the coordinated cell BTS uses the same frequency as macro cell, it also measures the macro cell BTS Tx signal properties.
2. Based on the Tx signal properties information from Marco cell database, or from direct communications with the corresponding neighbor coordinated cell BTSs, the coordinated cell BTS can estimate what its Tx signal properties should be in order not to introduce interference to the neighboring coordinated cells. In the case that the coordinated cell BTS uses the same frequency as macro cell, it also estimates what its Tx signal properties should be in order not to introduce interference to the macro cell.
3. It also communicates to the neighboring coordinated cell BTSs about its Tx signal properties via its OTACU. Upon request, the neighboring coordinated cells will measure and report the measurement results via their OTACUs. In the case that the coordinated cell BTS uses the same frequency as macro cell, when possible, macro cell BTS can also indirectly measure the coordinated cell BTS Tx signal properties via UEs in the macro cell.
4. Using the topology of the neighboring coordinated cells, which is from the database macro cell maintains, together with the feedback from neighboring coordinated cell BTSs, the coordinated cell BTS can configure its antenna including using MIMO or beam forming algorithms.
5. Coordinated cell BTS can repeat steps 1 through 4 iteratively to calibrate and fine tune the antenna configurations.

Aspects relating to location detection and location based services can be implemented with the location/GPS unit 359 and the control unit 354 shown in FIG. 3. If a standard GPS device is embedded in the coordinated cell BTS as the GPS unit 359, the location from the GPS can be reported to macro cell BTS during initialization so the macro cell BTS can input the location of the coordinated cell into the database. It can also be used to help authenticate the coordinated cell together with the SIM card based approach in described earlier. With a request from macro cell BTS, the coordinated cell BTS can also periodically report its location to identify a location change and to provide other services. Coordinated cell BTSs can also communications with each other about their location based on their GPS readings.

Alternatively, the auxiliary receiver can be used to perform a location algorithm (for example, using triangulation based upon signals to or from neighboring coordinated cell BTSs) to determine the location of a coordinated cell BTS. This can be coordinated by the OTACUs of the neighbor coordinated cells. With the request from a coordinated cell BTS or macro cell BTS, a number of neighbor coordinated cell BTSs send reference signals in a timing coordinated manner for the auxiliary receiver of the desired coordinated cell BTS to measure in order to determine the distance and thus the location of the desired BTS from the neighbor reference BTSs. There are a number of existing algorithms available for this purpose and can be used in this setting. The location determined in this fashion can be more accurate than a GPS based solution. It can be used in installation, authentication, interference management, antenna configuration, fraud detection, and other location based services.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

We claim

1. A method of operating a network of coordinated cell base stations with each coordinated cell base station having down link and up link communications with one or more associated user equipment, the method comprising:
    transmitting a database of information regarding the coordinated cell base stations in the network to a first coordinated cell base station;
    updating the database of information regarding the coordinated cell base stations in the network to include information relating to the first coordinated cell base station;
    the first coordinated cell base station receiving a communication from a neighboring coordinated cell base station; and
    adjusting a parameter of one or more of the down link communication and the up link communication of the first coordinated cell base station in response to the communication from a neighboring coordinated cell base station.

2. The method of claim 1 further comprising using an auxiliary receiver in the first coordinated cell base station to measure one or more parameters of the down link transmission of a macro cell base station.

3. The method of claim 1 further comprising
    reporting the measured one or more parameters of the down link transmission of the macro cell base station and the downlink transmission power of the first coordinated cell base station to a macro cell base station; and
    transmitting a desired downlink transmission power to the first coordinated cell base station.

4. The method of claim 1 further comprising
    reporting the uplink transmission power of the first user equipment device to a first macro cell base station;
    when the user equipment device up link transmission power generates a selected amount of interference with other user equipment devices in the macro cell of the first macro cell base station, sending an instruction to the first coordinated cell base station to send an instruction to the first user equipment device to decrease the power of its up link transmission.

5. The method of claim 1 further comprising the first coordinated cell base station measuring one or more parameters of the down link transmission of a neighboring coordinated cell base station and reporting the measurement to a first macro cell base station.

6. The method of claim 1 wherein an auxiliary receiver utilizes hardware of a second transceiver.

7. The method of claim 1 further comprising the first coordinated cell base station registering with a first macro cell base station via a wireless transceiver.

8. The method of claim 1 further comprising a first user equipment device registering with the first coordinated cell base station via a second wireless transceiver of the first coordinated cell base station.

9. A method of operating a network of coordinated cell base stations having associated user equipment devices, the method comprising:
    transmitting a database of information regarding the coordinated cell base stations in the network to a first coordinated cell base station;
    updating the database of information regarding the coordinated cell base stations in the network to include information relating to the first coordinated cell base station;
    using an auxiliary receiver in the first coordinated cell base station to measure one or more parameters of the down link transmission of a neighboring coordinated cell base station; and
    adjusting one or more down link communication parameters of the first coordinated cell base station in response to the measured one or more parameters.

10. The method of claim 9 wherein the parameter is the transmit power of the down link communications.

11. The method of claim 9 wherein the down link communications are transmitted as orthogonal frequency division multiplexed signals and the transmit power is adjusted for one or more tones.

12. The method of claim 9 wherein the down link communications are transmitted as orthogonal frequency division multiplexed signals and the adjustment to one or more parameters is to zero out tones.

13. The method of claim 9 wherein the adjustment of one or more parameters is changing the power of a code channel.

14. The method of claim 9 further comprising a first user equipment device registering with the first coordinated cell base station via a coordinated cell transceiver of the first coordinated cell base station.

15. A coordinated wireless base station system comprising:
    a base station subsystem for providing wireless down link communications to and receiving wireless up link communications from one or more wireless user equipment devices with the down link communications and the up link communications have associated parameters;
    an auxiliary receiver to measure one or more characteristics of a down link signal of a neighboring base station; and
    a control unit which receives from the auxiliary receiver the measurements of the one or more characteristics of the down link signal of a neighboring base station, determines control information relating to interference management in response to the received measurements of the one or more characteristics of the down link signal of a neighboring base station and provides control information relating to interference management to the base station subsystem;

wherein the base station subsystem adjusts one or more of the parameters of one or more of the uplink communications and the down link communications in response to the control information.

16. The system of claim 15 further comprising
an over-the-air communications unit in communication with the first base station subsystem for communicating with another base station in order to communicate with a second wireless coordinated base station.

17. The system of claim 15 wherein the parameter adjusted by the base station subsystem is the transmit power of the down link communications.

18. The system of claim 17 wherein the down link communications are transmitted as orthogonal frequency division multiplexed signals and the transmit power is adjusted for one or more tones.

19. The system of claim 15 wherein the down link communications are transmitted as orthogonal frequency division multiplexed signals and the adjustment to one or more parameters is to zero out tones.

20. The system of claim 15 wherein the adjustment of one or more parameters is changing the power of a code channel.

21. The system of claim 15 further comprising a directional and antenna and the adjustment of one or more parameters comprise changing the beam of the directional antenna.

22. The system of claim 15 wherein the adjustment of one or more parameters is transmitting instructions to change one or more parameters of the uplink.

23. The coordinated wireless base station system of claim 15 wherein the down link communications are transmitted as orthogonal frequency division multiplexed signals and the parameter adjusted by the base station subsystem is the transmit power for one or more tones.

24. The coordinated wireless base station system of claim 15 wherein the down link communications are transmitted as orthogonal frequency division multiplexed signals and the adjustment to one or more parameters by the base station subsystem is to zero out tones.

25. The coordinated wireless base station system of claim 15 wherein the adjustment of one or more parameters by the base station subsystem is changing the power of a code channel.

26. The coordinated wireless base station system of claim 15 further comprising a directional and antenna and the adjustment of one or more parameters by the base station subsystem comprise changing the beam of the directional antenna.

27. The coordinated wireless base station system of claim 15 wherein the adjustment of one or more parameters by the base station subsystem is transmitting instructions to one or more wireless user equipment devices to change one or more parameters of the uplink.

28. The coordinated wireless base station system of claim 15 further comprising a location detection unit which determines the location of the coordinated wireless base station and provides the location to the control unit.

* * * * *